United States Patent [19]
Hollnagel

[11] 3,762,385
[45] Oct. 2, 1973

[54] AIR FUEL PREHEATER FOR INTERNAL COMBUSTION ENGINE

[76] Inventor: Harold S. Hollnagel, 918 W. Laramie Ln., Milwaukee, Wis. 53217

[22] Filed: Mar. 29, 1971

[21] Appl. No.: 129,056

[52] U.S. Cl............................ 123/122 A, 123/119 B
[51] Int. Cl.... F02m 31/04, F02m 31/10, F02f 9/00
[58] Field of Search .................... 123/122 A, 122 B, 123/122 AA, 122 AC, 119 B

[56] References Cited
UNITED STATES PATENTS

| | | | |
|---|---|---|---|
| 1,128,998 | 2/1915 | Mulvaney | 123/122 AA |
| 3,088,447 | 5/1963 | Henderson | 123/119 B |
| 3,645,243 | 2/1972 | Ohlsson | 123/119 B X |
| 1,200,608 | 10/1916 | Hall | 123/122 AA |
| 2,720,197 | 10/1955 | Titus | 123/122 AB |
| 1,865,515 | 7/1932 | Godward | 123/122 A |
| 1,023,402 | 4/1912 | Whiting | 123/122 AA |
| 2,001,669 | 5/1935 | Smith | 123/122 AA |
| 2,389,714 | 11/1945 | Baker | 123/122 A |
| 2,617,633 | 11/1952 | Van den Bosch | 123/122 A |
| 3,042,016 | 7/1962 | Christian | 123/122 AA |
| 3,150,652 | 9/1964 | Hollabaugh | 123/122 A |

FOREIGN PATENTS OR APPLICATIONS 248,409   5/1926   Italy ............................ 123/122 AA

*Primary Examiner*—Al Lawrence Smith
*Attorney*—McGlynn, Reising, Milton, Ethington, Adelman, Krass, Perry, Young & Thorpe

[57] ABSTRACT

A water-jacketed fuel vaporizing chamber is interposed between the carburetor and the intake manifold on an internal combustion engine. The flow path is tortuous and of considerable length which induces some turbulence and insures full vaporization of the gasoline. Carbon monoxide emission was reduced 73 percent on a test vehicle to a level below the 1975 Federal Standards. Unburned hydrocarbons and nitrogen oxides were respectively reduced 40.6 percent and 36 percent but not to the 1975 Federal Standards.

3 Claims, 4 Drawing Figures

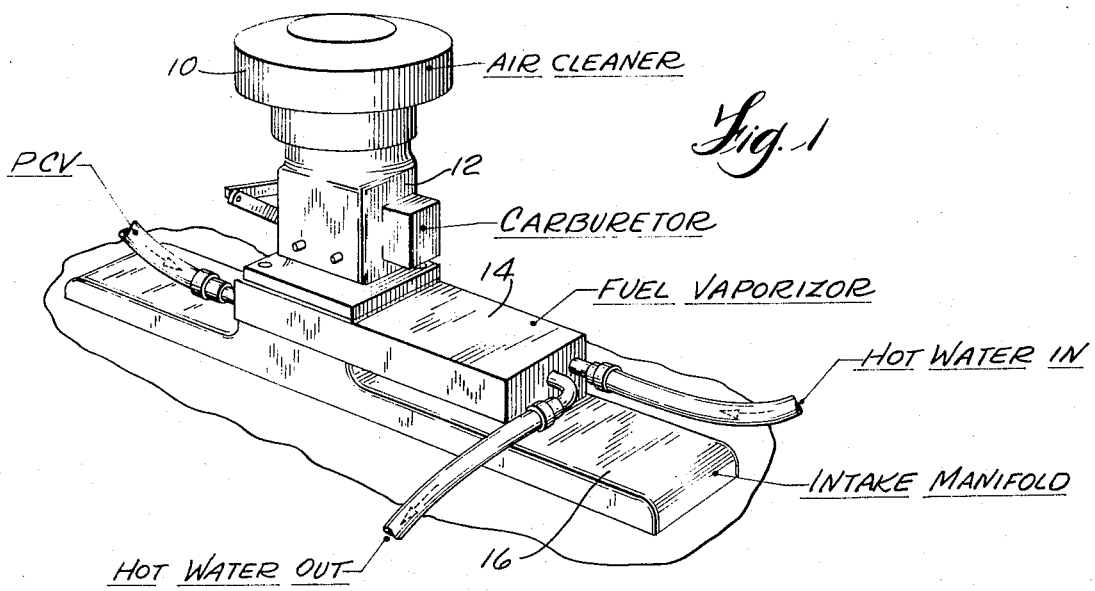
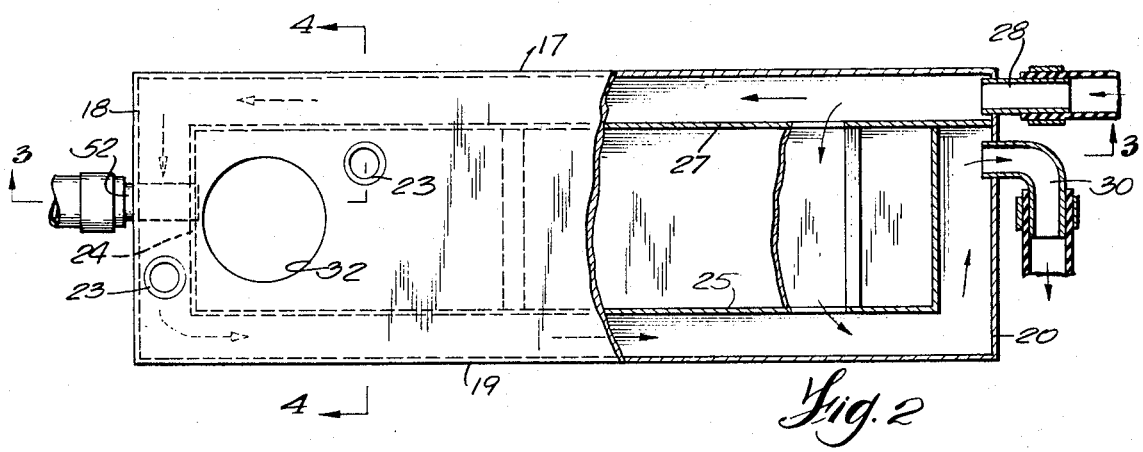
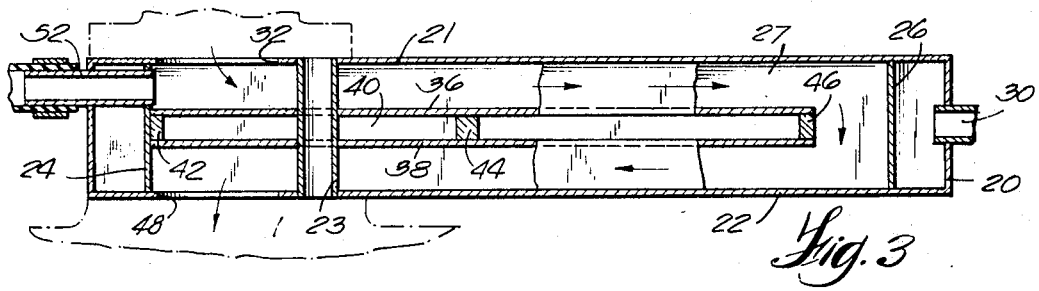
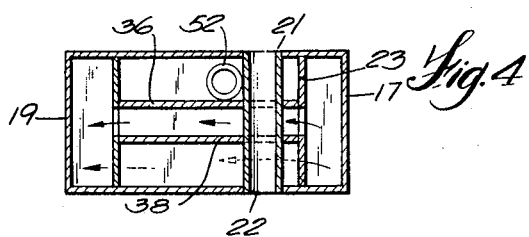

AIR FUEL PREHEATER FOR INTERNAL COMBUSTION ENGINE

BACKGROUND OF INVENTION

It has previously been proposed to heat the air-fuel mixture leaving the carburetor in a throat section located between the carburetor and the intake manifold. Some of these heated sections have been heated by exhaust gases while others have been heated by water from the cylinder head. Heating with exhaust gases poses some safety problems and while the available heat is substantial it can be too great. Even in the case of the hot water-jacketed throat sections, provisions have been made to reduce the heating on idle conditions, for example. See U.S. Pat. 3,150,652. This patent (assigned to Ford Motor Company) indicates that heating at idle speeds can result in severe leaning out of the mixture with adverse results on the engine performance. Furthermore, the patent indicates there is no need for heat when the engine is up to normal temperatures and operating at normal speeds.

SUMMARY OF INVENTION

The present vaporizing chamber provides heat to the engine throughout its operating range and there is no noticeable adverse effect on engine performance either at idle or at high speed. This device has been applied to an otherwise standard 1970 Maverick automobile manufactured by Ford and was tested at Ethyl Corporation facilities. The test is the Federal cycle and the following results were obtained (in summary form). Without the present device the standard automobile delivered exhaust emission results as follows:

| Unburned Hydrocarbons | % Carbon Monoxide | Nitrogen Oxides |
|---|---|---|
| 383 PPM | 0.93 | 1,774 PPM |

The same car modified only to use the present device delivered the following summary results:

| Hydrocarbons | % Carbon Monoxide | Nitrogen Oxides |
|---|---|---|
| 228 | 0.25 | 1,135 |

This shows following percentage reductions:

| Hydrocarbons | % Carbon Monoxide | Nitrogen Oxides |
|---|---|---|
| 40.6% | 73% | 36% |

The carbon monoxide emission level meets the 1975 standards.

The principal difference between the present arrangement and the prior art appears to be that with this device heat is applied at all times and the heated path is greatly increased as well as being made somewhat turbulent and both of these latter features run contrary to normal intake manifold design which strives to shorten the path to the cylinder and to reduce turbulence to a minimum. With this arrangement there is sufficient residence time to insure complete vaporization and, in fact, according to the prior art, too much vaporization. However, the performance is good and, along with the reduction in emission, there is an increase in mileage of approximately 10 percent. Recent experience seems to be that all the emission reduction devices on the market result in a reduction in mileage (which then means more fuel is burned per mile and one wonders whether there is any gain) while the present device not only reduces emission but increases the mileage.

Further improvement in the performance can logically be expected in conjunction with carburetors which more precisely meter the fuel flow than in the usual carburetor. Carburetors such as the SU would seem to be well adapted to this use particularly when set up for lean operation as in the Volvo. Additional improvement might well be expected through the injection of air at the exhaust ports to encourage afterburning as done in the Toyota.

In connection with air cooled engines the heating can be derived from exhaust gases taken in limited quantity from the exhaust manifold. Since this would obviate the need for liquid tight joints between the jacket and fuel flow path this may be advantageous with water cooled engines.

DESCRIPTION OF THE DRAWINGS

FIG. 1 is a somewhat schematic perspective view of the fuel vaporizer between the carburetor and the intake manifold.

FIG. 2 is a plan view of the vaporizer with a portion broken away.

FIG. 3 is a vertical section taken on meandering line 3—3 in FIG. 2.

FIG. 4 is a vertical section taken on line 4—4 in FIG. 2.

DESCRIPTION OF PREFERRED EMBODIMENT

FIG. 1 shows schematically the arrangement employed in modifying the Maverick automobile as described above. Here the standard air cleaner 10 is mounted on top of the standard carburetor 12 in the usual manner. The fuel vaporizer 14 is interposed between the carburetor and the intake manifold 16. This is the area in which the improvement has been made in the performance of the vehicle so far as emission is concerned.

The vaporizer unit 14 has side walls 17, 18, 19, 20, a top wall 21 and a bottom wall 22. Provision is made for the two carburetor mounting studs to pass through sleeves 23, 23 so that the vaporizer can be inserted between the carburetor and the manifold simply by using longer mounting bolts.

The housing has a water jacket surrounding the entire periphery in the horizontal sense. Water enters the jacket through inlet 28 and leaves via outlet 30. Thus in FIG. 2 the water enters at the upper right corner and can flow down the length of the jacket between wall 17 and inside wall 27 to the end wall 18 where it turns towards the bottom of the figure flowing between outer wall 18 and inside wall 24. The flow returns between wall 19 and inside wall 25 and then flows to the outlet 30 between end wall 20 and inside wall 26. The hot water is taken from the cylinder head so as to have the hottest water available and as soon as possible.

The incoming air-fuel mixture from the carburetor comes down through the orifice 32 in the top wall 21, strikes the central partition or baffle which is also heated. Thus the upper baffle plate 36 is separated from the lower baffle plate 38 providing a water flow path 40 therebetween. The spacers 42, 44, 46 merely function to keep the plates apart. It will be noted in FIG. 4 that the longitudinal sides of the baffle jacket are open to allow water to enter from the inlet side of the water jacket to the outlet side, which would be the top of FIG. 2 to the bottom of FIG. 2 as indicated by the arrows in FIG. 2. Therefore, the incoming air-fuel mixture is deflected by the heated, water-jacket baffle so that it must flow to the right in FIGS. 2 and 3 to the end of the baffle where it turns between the baffle and wall 26 to return and leave via outlet orifice 48.

The usual PCV tube is connected at nipple 52 to be mixed with the air-fuel mixture at the entrance portion of the vaporizer unit to mix the crankcase vapors well in the fuel mixture.

It will be apparent that this design runs contrary to normal carburetor and manifold design practice which dictates that the flow path from the carburetor to the cylinder should be as short as possible and as streamlined as possible. The present unit obviously requires the air-fuel mixture to follow a tortuous path which will obviously induce turbulence. Notwithstanding this, the engine performance appeared to be unaffected so far as acceleration, etc., is concerned. A big improvement came in the marked reduction in exhaust emission as set forth above while at the same time obtaining an increase in mileage. If one considers the increase in mileage in combination with the reduction in exhaust gases, the reduction per mile is even more pronounced and is obviously greater than the reduction indicated by the test itself.

As indicated above, this is the arrangement used in modifying a Maverick with a single-throat carburetor. The same concept has been applied to a Pontiac having a dual carburetor. In this instance the vaporizer had an outside water jacket much the same as the present one but the horizontal baffle was not heated. However, at the turning point between the upper and lower reaches of the horizontal flow in the vaporizer, cross tubes were placed so the air-fuel mixture had to flow over the heated cross tubes which also induced considerable turbulence and mixing. This automobile was not tested for precise emission standards but mileage increased in the neighborhood of 10 percent. So presumably the results were the same so far as emission was concerned. Visually there was an appreciable improvement in the nature of the exhaust gases.

A very interesting aspect of this device is that dirty or fouled spark plugs have been inserted into the cylinder head and after only a relatively small amount of running in an engine fitted with this vaporizer, the spark plugs were clean. In other words, the combustion is so clean that it cleaned up the spark plugs. This also would indicate a considerable and long life effect. Normally spark plugs tend to foul out with a consequent decrease in performance and increase in emission. That would appear to be controlled by this vaporizer although not enough experience has been gained in this regard to be definitive. Certainly the cleaning of the spark plugs indicates that fouling will not become a problem and, therefore, the gradual decrease in performance and increase in emission will also not be a problem.

The illustrated embodiment shows the vaporizer housing inlet and outlet in alignment so as to permit simple insertion in existing arrangements. It should be apparent, however, that the concept could be applied to permit non-aligned inlet and outlet openings in the vaporizer so that the carburetor could be located in a more convenient place if desired; for example, the fuel mixture could enter at one end of the vaporizer and exit at the other end. It is felt important, however, to have a deviated flow path as opposed to the straight throat heated sections found in the prior art.

The important feature here seems to be the tortuous path through the heated zone coupled with the turbulence that is induced. Contrary to the teachings of the Ford Motor patent mentioned above, there is no adverse effect by reason of the heating throughout the operating range. The vaporizer unit can be readily applied without unduly increasing the vertical height of the overall engine, that is it doesn't put the air cleaner appreciably higher than it is with the present construction. The entire package is quite neat and does not require any added clearance between the air cleaner and the underside of the hood.

Heating by means of exhaust gases instead of water is indicated in connection with air cooled engines and also on marine engines where the water jacket temperature does not get very high. The amount of exhaust gas used would be controlled to avoid too hot conditions in the vaporizer. Such an approach may also be indicated on standard engines.

I claim:

1. A combination comprising; an internal combustion engine having a fuel-air intake manifold; a heat exchanger connected to said intake manifold; a carburetor attached to said exchanger; said exchanger including a housing, said housing having an inlet in communication with said carburetor and an outlet in communication with said manifold, said housing having a flat wall directly opposite to said inlet for forcing the fuel-air mixture entering said housing from said inlet through a turbulent turn, said wall having at least one passage therebehind through which a heated medium flows for heating the fuel-air mixture through said wall, said housing including a second wall extending laterally into the flow path of the fuel-air mixture to force a second turbulent change in the direction of the flow path, said walls being disposed at angles of 90° and 180° relative to one another, said housing having four outer sides and a top and bottom, said inlet being in said top and said outlet being in said bottom, four inner sides spaced inwardly of said outer sides to define therebetween said passage for a heated medium, said first mentioned wall being defined by a first plate spaced below said top and extending between said inner sides, a second plate spaced from said bottom and from said first plate and extending between said inner sides, said inner sides having openings therein between said first and second plates to define another passage interconnecting said first mentioned passage.

2. A combination as set forth in claim 1 wherein said housing includes a plurality of sleeves extending between said top and bottom to define bores through said housing isolated from said flow path and said passages, and fastening means extending through said bores for connecting said carburetor and said housing to said manifold.

3. A combination as set forth in claim 1 wherein said housing includes an inlet and outlet to said passage and a PCV valve connection in fluid communication with said passage.

* * * * *